United States Patent
Tateishi et al.

(10) Patent No.: US 11,779,076 B2
(45) Date of Patent: Oct. 10, 2023

(54) CUSHION AND SHOE

(71) Applicant: ASICS CORPORATION, Kobe (JP)

(72) Inventors: Junichiro Tateishi, Kobe (JP); Sho Sato, Kobe (JP)

(73) Assignee: ASICS CORPORATION, Kobe (JP)

( * ) Notice: Subject to any disclaimer, the term of this patent is extended or adjusted under 35 U.S.C. 154(b) by 200 days.

(21) Appl. No.: 17/131,734

(22) Filed: Dec. 22, 2020

(65) Prior Publication Data

US 2021/0195994 A1    Jul. 1, 2021

(30) Foreign Application Priority Data

Dec. 27, 2019 (JP) ................................ 2019-238172

(51) Int. Cl.
| | |
|---|---|
| A43B 13/12 | (2006.01) |
| A43B 7/14 | (2022.01) |
| C08J 9/04 | (2006.01) |
| A43B 1/00 | (2006.01) |
| A43B 7/144 | (2022.01) |
| A43B 7/32 | (2006.01) |
| A43B 13/04 | (2006.01) |
| A43B 13/18 | (2006.01) |
| A43B 13/22 | (2006.01) |
| C08J 9/00 | (2006.01) |
| C08L 23/08 | (2006.01) |
| C08L 53/00 | (2006.01) |
| B32B 27/30 | (2006.01) |
| B32B 27/32 | (2006.01) |

(52) U.S. Cl.
CPC .......... *A43B 13/127* (2013.01); *A43B 1/0072* (2013.01); *A43B 7/144* (2013.01); *A43B 7/32* (2013.01); *A43B 13/04* (2013.01); *A43B 13/188* (2013.01); *A43B 13/223* (2013.01); *C08J 9/0061* (2013.01); *C08L 23/0815* (2013.01); *C08L 23/0853* (2013.01); *C08L 53/00* (2013.01); *B32B 27/306* (2013.01); *B32B 27/32* (2013.01); *B32B 2437/02* (2013.01); *C08J 2309/06* (2013.01); *C08J 2323/16* (2013.01); *C08J 2409/06* (2013.01); *C08L 2203/14* (2013.01)

(58) Field of Classification Search
CPC ..... A43B 13/127; A43B 1/0072; A43B 7/144; A43B 7/32; A43B 13/04; A43B 13/188; A43B 13/223; A43B 13/187; C08J 9/0061; C08J 2309/06; C08J 2323/16; C08J 2409/06; C08J 9/0023; C08J 9/0066; C08J 9/0095; C08J 2323/08; C08J 2353/00; C08J 2353/02; C08J 2423/08; C08J 2423/16; C08J 2453/00; C08J 2453/02; C08L 23/0815; C08L 23/0853; C08L 53/00; C08L 2203/14; C08L 2310/00; C08L 23/08; C08L 23/16; B32B 27/306; B32B 27/32; B32B 2437/02

See application file for complete search history.

(56) References Cited

U.S. PATENT DOCUMENTS

| | | |
|---|---|---|
| 2013/0123379 A1 | 5/2013 | Mcphee |
| 2014/0378570 A1 | 12/2014 | Tabor et al. |
| 2017/0190829 A1 | 7/2017 | Tian et al. |
| 2017/0215522 A1 | 8/2017 | Tateishi et al. |
| 2017/0267850 A1* | 9/2017 | Baghdadi ............ C08L 23/0853 |
| 2018/0258214 A1 | 9/2018 | Tian et al. |
| 2019/0016847 A1 | 1/2019 | Henning et al. |
| 2019/0231026 A1 | 8/2019 | Fujita et al. |

FOREIGN PATENT DOCUMENTS

| | | |
|---|---|---|
| JP | 2016-113614 A | 6/2016 |
| WO | 2016/051532 A1 | 4/2016 |
| WO | 2018070045 A1 | 4/2018 |

OTHER PUBLICATIONS

Infuse 9000 Olefin Block Copolymer, Technical data, 2011.*
An Office Action; "Notice of Reasons for Refusal", mailed by the Japanese Patent Office dated Dec. 10, 2021, which corresponds to Japanese Patent Application No. 2020-205796 and is related to U.S. Appl. No. 17/131,734; with English language translation.
The extended European search report issued by the European Patent Office dated May 7, 2021, which corresponds to European Patent Application No. 20217166.6-1005 and is related to U.S. Appl. No. 17/131,734.
Communication pursuant to Article 94(3) EPC issued by the European Patent Office dated Jun. 1, 2022, which corresponds to European Patent Application No. 20217166.6-1015 and is related to U.S. Appl. No. 17/131,734.
An Office Action mailed by China National Intellectual Property Administration dated Feb. 17, 2023, which corresponds to Chinese Patent Application No. 202011377935.3 and is related to U.S. Appl. No. 17/131,734; with English language translation.

* cited by examiner

Primary Examiner — Irina S Zemel
(74) Attorney, Agent, or Firm — Studebaker & Brackett PC (57) ABSTRACT

The present invention provides a cushion partially or entirely composed of a foam, the foam composed of a polymer composition that includes a homopolymer or a copolymer including a constituent unit derived from farnesene.

7 Claims, 4 Drawing Sheets

CUSHION AND SHOE

CROSS-REFERENCE TO RELATED APPLICATION

This application claims priority to Japanese Patent Application No. 2019-238172, the disclosure of which is incorporated herein by reference in its entirety.

FIELD

The present invention relates to a cushion and a shoe, more specifically, relates to a cushion partially or entirely composed of a foam composed of a polymer composition and a shoe including such a cushion.

BACKGROUND

Conventionally, cushions composed of a gel or a foam are provided in sporting goods or the like (WO2018/070045 A).

SUMMARY

The degree of cushioning characteristics exhibited by a foam or the like is generally represented by, for example, a ratio (loss tangent) of a loss elastic modulus to a storage elastic modulus obtained by a kinematic viscoelasticity measurement. In this regard, a method for enabling the foam to exhibit a high loss tangent has not been fully established. Therefore, it is an object of the present invention to provide a cushion excellent in cushioning properties by providing a foam having a high loss tangent, and hence to provide a shoe excellent in cushioning performance.

For improving the basic understanding on the some features of the invention of the present application, a brief summary of the present invention will be described below. This summary does not show the outline of the present invention, and is not intended to specify the main or important features of the present invention or to limit the scope of the present invention. The purpose thereof is only to provide some of basic concepts of the invention in a simplified style as a premise of the subsequent detailed description of the invention.

In order to solve the aforementioned problem, the present invention provides a cushion partially or entirely composed of a foam composed of a polymer composition, wherein the polymer composition includes: a first component composed of one or more farnesene-based polymers; and a second component composed of one or more polymers different from the one or more farnesene-based polymers.

The present invention also provides a shoe including a shoe sole that includes the aforementioned cushion.

BRIEF DESCRIPTION OF DRAWINGS

The aforementioned features and the other features of the present inventio_will be clarified by the following description and figures illustrating the embodiments of the present invention.

DESCRIPTION OF EMBODIMENTS

Figure 1:
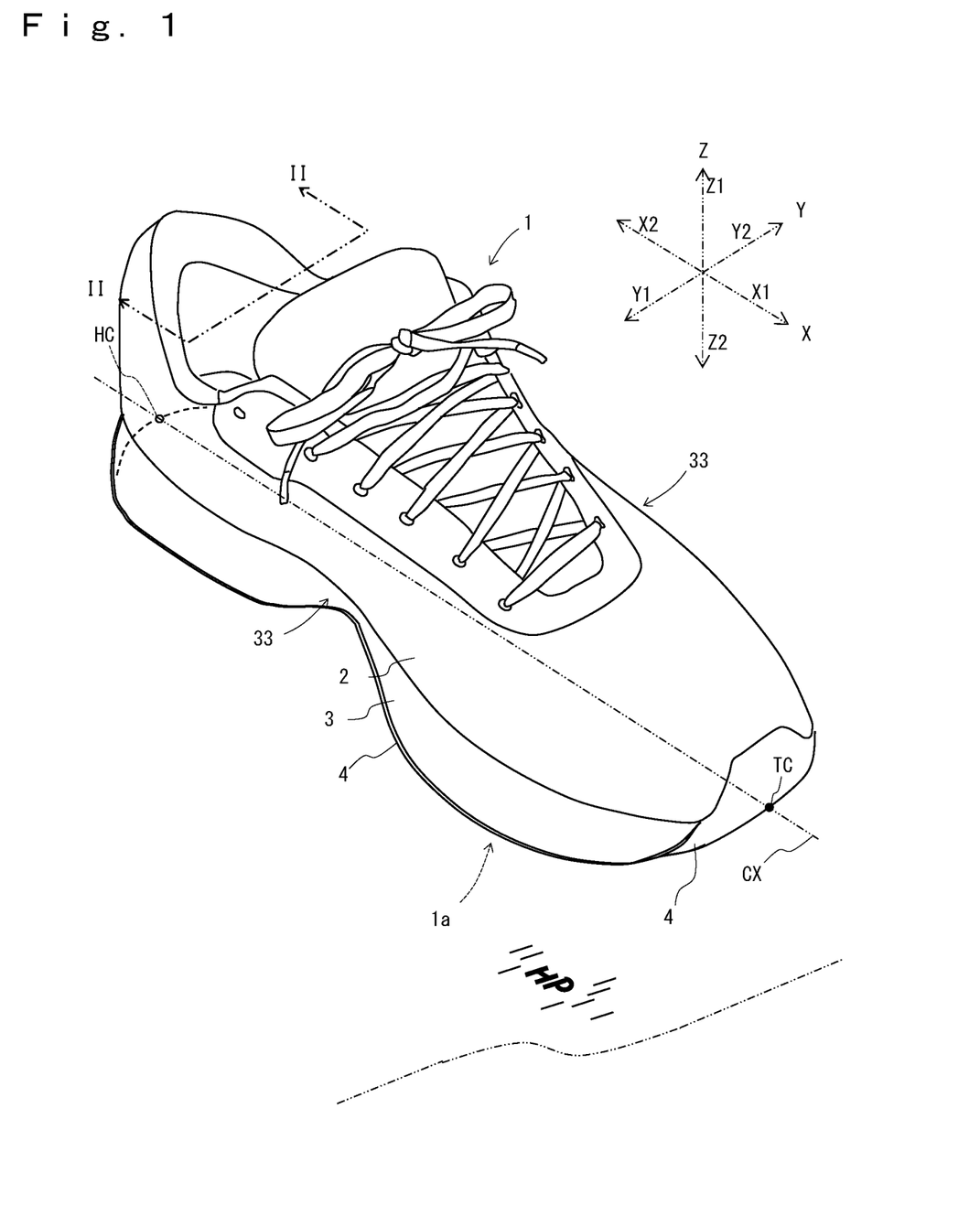
FIG. 1 is a schematic perspective view showing an example of a shoe including a cushion according to an embodiment.

Hereinafter, a shoe member of the present invention will be described by way of embodiments. FIG. 1 shows a shoe that is at least partially composed of a shoe member of this embodiment. The shoe 1 includes an upper 2 and a shoe sole member. The shoe 1 includes a midsole 3 and an outsole 4 as the shoe sole member.

Hereinafter, when a description is given on, for example, the shoe 1 shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Among directions orthogonal to the shoe center axis CX, a direction parallel to a horizontal plane HP may be referred to as, for example, a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

Figure 2:
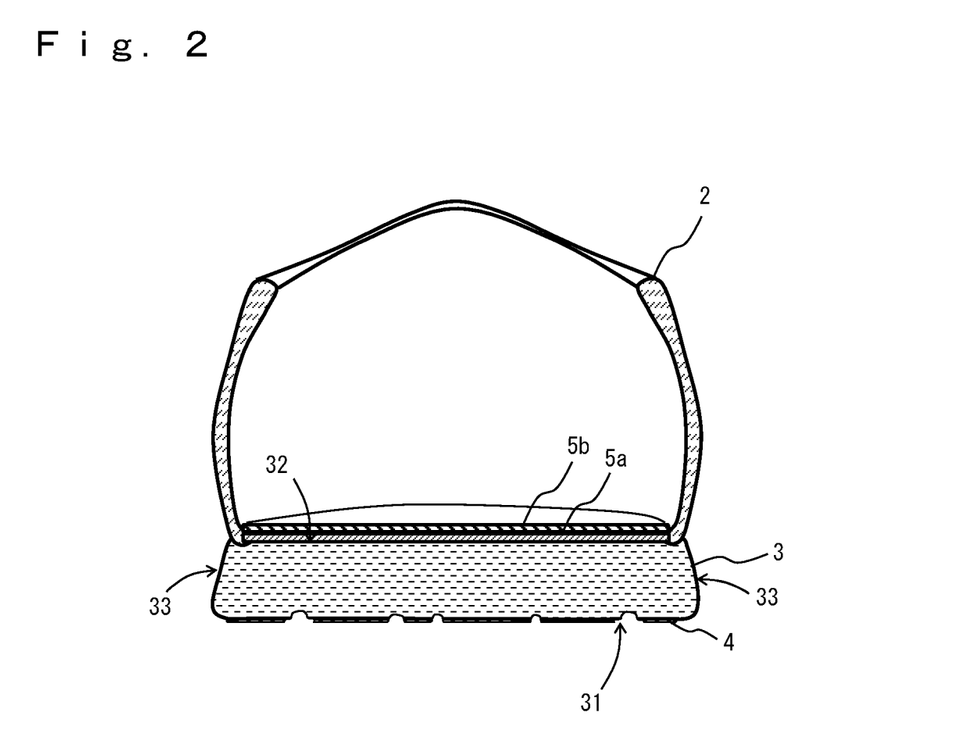
FIG. 2 is a schematic cross-sectional view showing an arrangement of the cushion (i.e., a cross-sectional view taken along the line and viewed in the direction of arrows II-II thereof in FIG. 1).

As shown in FIG. 1 and FIG. 2, the shoe 1 of this embodiment includes the outsole 4 in its bottommost position. The outsole 4 constitutes the ground engaging surface of the shoe 1. The shoe 1 includes the midsole 3 between the outsole 4 and the upper 2 that covers a foot of a wearer from the upper side. The midsole 3 of this embodiment has a flat shape, and is arranged so that the thickness direction thereof corresponds to the height direction Z of the shoe. The shoe 1 of this embodiment further includes an inner sole 5a that covers an upper surface of the midsole 3 and a sock liner 5b that is arranged on the upper side of the inner sole 5a.

A lower surface 31 of the midsole 3 is in contact with an upper surface of the outsole 4, and an upper surface 32 of the midsole 3 is in contact with the inner sole 5a from below. Side portions 33 of the midsole 3 are in an exposed state without being covered with, for example, the upper 2 or the outsole 4. The side portions 33 of the midsole 3 may be partially or entirely covered with the outsole 4. Further, the outsole 4 may not be provided.

The shoe 1 of this embodiment is provided with a shoe sole in which the midsole 3 serves as a cushion having excellent cushioning properties. That is, the cushion is arranged in the shoe 1 of this embodiment to give excellent cushioning properties over the entire area in the length direction and the width direction of the shoe sole.

The midsole 3 of this embodiment is entirely composed of the foam. The foam constituting the midsole 3 of this embodiment is composed of a polymer composition. In this embodiment, the function that the polymer composition composed of a first component composed of one or more farnesene-based polymers and a second component composed of one or more polymers different from the one or more farnesene-based polymers shows a high loss tangent is utilized to enable the midsole 3 (cushion) composed of the aforementioned polymer composition to exhibit excellent cushioning characteristics. The farnesene-based polymer of this embodiment is a homopolymer including a constituent unit derived from farnesene, or a copolymer including a constituent unit derived from farnesene.

The second component of this embodiment preferably includes one or more of polymers selected from ethylene-α-olefin block copolymer (OBC), ethylene-vinyl acetate copolymer (EVA), ethylene-α-olefin random copolymer (POE), and a common rubber.

The second component may include, for example, a fluorine-based polymer such as a fluorine resin or a fluorine rubber; a polyamide-based polymer such as a polyamide resin such as polyamide 6, polyamide 11, polyamide 12, polyamide 6,6 or polyamide 610, or a polyamide-based elastomer; a polyester-based resin such as polyethylene terephthalate or polybutylene terephthalate; a polyvinyl chloride resin; an acrylic resin such as polymethyl methacrylate; silicone-based elastomer; ethylene propylene rubber (EPR); ethylene propylene diene rubber (EPDM); butadiene rubber (BR); isoprene rubber (IR); chloroprene (CR); natural rubber (NR); styrene butadiene rubber (SBR); acrylonitrile butadiene rubber (NBR); or butyl rubber (IIR).

The second component may include, for example, a polyethylene resin such as a low-density polyethylene resin (LDPE), a linear low-density polyethylene resin (LLDPE), or a high density polyethylene resin (HDPE); a polypropylene resin such as propylene homopolymer (homo PP), a random polypropylene resin (random PP), or a block polypropylene resin (block PP); cyclic olefin polymer (COP); cyclic olefin copolymer (COC); a polyurethane-based polymer such as a polyester-based polyurethane resin or a polyether-based polyurethane resin; or a styrene-based polymer such as a polystyrene-resin, an acrylonitrile styrene-resin (AS resin), an acrylonitrile butadiene styrene resin (ABS resin), or a styrene-based thermoplastic elastomer (TPS).

The styrene-based thermoplastic elastomer (TPS) may be, for example, styrene-ethylene-butylene copolymer (SEB), styrene-butadiene-styrene copolymer (SBS), hydrogen additive of SBS (styrene-ethylene-butylene-styrene copolymer (SEBS)), styrene-isoprene-styrene copolymer (SIS), hydrogen additive of SIS (styrene-ethylene-propylene-styrene copolymer (SEPS)), styrene-butadiene-isoprene-styrene copolymer (SBIS), hydrogen additive of SBIS (styrene-ethylene-ethylene propylene-styrene-copolymer (SEEPS)), styrene-isobutylene-styrene-copolymer (SIBS), styrene-butadiene-styrene-butadiene (SBSB), or styrene-butadiene-styrene-butadiene-styrene (SBSBS).

It is preferable that the aforementioned polymers having a Type-A durometer hardness of 93 or less be included in the second component. The Type-A durometer hardness of the polymers included in the second component is more preferably 91 or less, still more preferably 90 or less, particularly preferably 89 or less. The Type-A durometer hardness of the polymers can be, for example, 15 or more. The Type-A durometer hardness of the polymers can be measured based on JIS K 6253-3:2012.

The polymer composition of this embodiment preferably includes at least one of ethylene-α-olefin block copolymer (OBC) and ethylene-vinyl acetate copolymer (EVA) as the second component.

The polymer composition of this embodiment may include either one or both of ethylene-α-olefin block copolymer (OBC) and ethylene-vinyl acetate copolymer (EVA). Further, the first component of the polymer composition of this embodiment may be composed of either one or both of a homopolymer including a constituent unit derived from farnesene and a copolymer including a constituent unit derived from farnesene.

In the case where the polymer composition of this embodiment includes ethylene-α-olefin block copolymer (OBC), a plurality of ethylene-α-olefin block copolymers (OBC) may be included.

In the case where the polymer composition of this embodiment includes ethylene-vinyl acetate copolymer (EVA), a plurality of ethylene-vinyl acetate copolymers (EVA) may be included.

In the case where the first component of the polymer composition of this embodiment includes the aforementioned homopolymer (hereinafter also referred to as "farnesene homopolymer"), a plurality of farnesene homopolymers may be included.

In the case where the first component of the polymer composition of this embodiment includes the aforementioned copolymer (hereinafter also referred to as "farnesene copolymer"), a plurality of farnesene copolymers may be included.

The content ratios of the farnesene homopolymer and the farnesene copolymer included in the first component of the polymer composition are not particularly limited as long as the total amount of the farnesene homopolymer and the farnesene copolymer is 100 mass %.

In the polymer composition, the ratio of the first component relative to the total mass of the first component and the second component is preferably 1 mass % or more, more preferably 5 mass % or more, still more preferably 10 mass % or more. The aforementioned ratio of the first component is preferably 60 mass % or less, more preferably 50 mass % or less, still more preferably 40 mass % or less. The ratio of the first component preferably lies in a range set with a lower limit selected from the aforementioned lower limits and an upper limit selected from the aforementioned upper limits.

The ratio of the first component in the entire polymer composition including an additive or the like (i.e., ratio of the first component in the foam) is preferably 1 mass % or more, more preferably 5 mass % or more, still more preferably 10 mass % or more. The aforementioned ratio of the first component is preferably 60 mass % or less, more preferably 50 mass % or less, still more preferably 40 mass % or less. The ratio of the first component preferably lies in a range set with a lower limit selected from the aforementioned lower limits and an upper limit selected from the aforementioned upper limits.

The ratio of the second component in the entire polymer composition including an additive or the like (i.e., ratio of the second component in the foam) is preferably 30 mass % or more, more preferably 40 mass % or more, still more preferably 50 mass % or more. The aforementioned ratio of the second component is preferably 95 mass % or less, more preferably 90 mass % or less, still more preferably 85 mass % or less. The ratio of the second component preferably lies in a range set with a lower limit selected from the aforementioned lower limits and an upper limit selected from the aforementioned upper limits.

When the total mass of the second component included per unit volume is X0 and the total mass of the ethylene-α-olefin block copolymer (OBC) and the ethylene-vinyl acetate copolymer (EVA) is X1, it is preferable that the polymer composition of this embodiment satisfy formula (1) below:

$$(X1/X0) \times 100(\%) \geq 25(\%) \qquad (1).$$

That is, the total amount of the ethylene-α-olefin block copolymer (OBC) and the ethylene-vinyl acetate copolymer (EVA) relative to the second component is preferably 25 mass % or more. The aforementioned ratio is more preferably 30 mass % or more, still more preferably 45 mass % or more, particularly preferably 60 mass % or more. The aforementioned ratio may be even 75 mass % or more, 90 mass % or more, or may be even 99 mass % or more.

When comparing the ethylene-α-olefin block copolymer (OBC) with the ethylene-vinyl acetate copolymer (EVA), the ethylene-vinyl acetate copolymer (EVA) tends to more significantly exhibit the effect according to cushioning characteristics. Accordingly, it is preferable that, of the ethylene-α-olefin block copolymer (OBC) and the ethylene-vinyl acetate copolymer (EVA), at least the ethylene-vinyl acetate copolymer (EVA) be included in the second component.

When the mass of the ethylene-α-olefin block copolymer (OBC) included per unit volume is X11, and the mass of the ethylene-vinyl acetate copolymer (EVA) included per unit volume is X12, it is preferable that the polymer composition satisfy formula (2) below:

$$X12 > X11 \qquad (2).$$

In other words, when the total mass (X11+X12) of the ethylene-α-olefin block copolymer (OBC) and the ethylene-vinyl acetate copolymer (EVA) is X1, it is preferable that the polymer composition satisfy formula (3) below:

$$(X12/X1) \times 100(\%) > 50(\%) \qquad (3).$$

That is, the ratio of the mass of the ethylene-vinyl acetate copolymer (EVA) (X12) relative to the total mass (X1) of the ethylene-α-olefin block copolymer (OBC) and the ethylene-vinyl acetate copolymer (EVA) is preferably more than 50 mass %. The aforementioned ratio is more preferably 60 mass % or more, still more preferably 70 mass % or more, particularly preferably 80 mass % or more. The aforementioned ratio may be even 90 mass % or more, 95 mass % or more, or may be even 100 mass %.

The ethylene-vinyl acetate copolymer (EVA) is preferably a random copolymer. In order to enable the polymer composition to exhibit flexibility and adhesion properties, the content ratio of vinyl acetate (VA content) of the ethylene-vinyl acetate copolymer is preferably 8 mass % or more, more preferably 10 mass % or more, still more preferably 12 mass % or more. The content ratio of vinyl acetate is preferably 35 mass % or less, more preferably 30 mass % or less. The content of the vinyl acetate preferably lies in a range set with a lower limit selected from the aforementioned lower limits and an upper limit selected from the aforementioned upper limits.

The ethylene-α-olefin block copolymer (OBC) is preferably ethylene-α-olefin copolymer having a density of more than 0.86 g/cm$^3$ and less than 0.89 g/cm$^3$. A melting point (melting peak temperature) obtained by DSC method (heating rate at 10° C./min) of the ethylene-α-olefin block copolymer (OBC) is preferably 115° C. or more and 125° C. or less.

The ethylene-α-olefin block copolymer (OBC) is suitable as a polymer for allowing olefin to generate micro crystals. The ethylene-α-olefin block copolymer is preferably either ethylene-hexane block copolymer or ethylene-octene block copolymer. In this embodiment, the ethylene-α-olefin block copolymer included in the polymer composition is more preferably ethylene-octene block copolymer. The ethylene-α-olefin block copolymer (OBC) is preferably a copolymer obtained by polymerization of ethylene and α-olefin having 4 or more carbon atoms in the presence of two different polymerization catalysts and a chain transfer agent (i.e., shuttling agent described in WO 2005/090426 and WO 2005/090427) such as alkylaluminum or alkyl zinc compound. The copolymer thus obtained will be referred to as chain shuttling copolymer.

In a block copolymer, a plurality of blocks each composed of the same monomers are present in one molecule. A common block copolymer has blocks respectively having short lengths, and the lengths are greatly different from each other between one block and another block, which makes it hard to generate a crystal. Even if a crystal is generated, the crystal has greatly different structures from the structure of a crystal obtained by forming a homopolymer from monomers forming each block. During the polymerization of the chain shuttling copolymer, each of homopolymerization and block copolymerization is repeated multiple times, so that blocks formed during the proceeding of the homopolymerization have lengths equal to or longer than a certain length. Further, since the blocks of the chain shuttling copolymer have a substantially uniform length, a crystal similar to the crystal obtained by forming a homopolymer from monomers that constitute each block can be easily formed. Specifically, the chain shuttling copolymer of ethylene and 1-octene block includes, in a molecule, ethylene blocks capable of being crystallized similarly to high density polyethylene (HDPE) which is an ethylene homopolymer. Accordingly, the ethylene-octene block copolymer, which is a chain shuttling copolymer, may include many fine crystals having the same structure as that of crystals of high density polyethylene. The fine crystals are effective for allowing the foam to exhibit excellent strength. The ethylene-octene block copolymer effectively functions to form a large number of such crystals in a part or member composed by the polymer composition. In other words, the ethylene-α-olefin block copolymer preferably shows a melting point similar to that of the high density polyethylene (HDPE), and a melting point (melting peak temperature) obtained by DSC method (heating rate at 10° C./min) of the ethylene-α-olefin block copolymer is preferably 115° C. or more and 125° C. or less.

As described above, the homopolymer or the copolymer including a constituent unit derived from farnesene is included in the polymer composition together with the ethylene-vinyl acetate copolymer (EVA), the ethylene-α-olefin block copolymer (OBC), or the like. The farnesene included in the homopolymer (farnesene homopolymer) or the copolymer (farnesene copolymer) that includes a constituent unit derived from farnesene may be α-farnesene or β-farnesene. The farnesene included in the farnesene homopolymer or the farnesene copolymer is preferably β-farnesene. Examples of the farnesene copolymer include a copolymer of farnesene and styrene and a copolymer of farnesene and butadiene. The farnesene copolymer may be, for example, a terpolymer of farnesene, styrene, and butadiene. The farnesene copolymer may include a constituent unit derived from a monomer other than the aforementioned monomers.

The farnesene copolymer may be a random copolymer, a block copolymer, or a graft copolymer. In order to allow the farnesene copolymer of this embodiment to easily exhibit the inherent characteristics of farnesene, the farnesene copolymer preferably has a large polyfarnesene moiety, and preferably is a block copolymer. The farnesene copolymer of this embodiment is preferably a block copolymer including a polystyrene block and a polyfarnesene block. Further, the farnesene copolymer of this embodiment preferably has a hydrogenated polyfarnesene block. That is, the polymer composition of this embodiment preferably includes a hydrogenated styrene farnesene block copolymer.

The farnesene copolymer of this embodiment is preferably either a diblock copolymer or a triblock copolymer. The farnesene copolymer of this embodiment is preferably a triblock copolymer. That is, the polymer composition of this embodiment preferably includes a copolymer that includes polystyrene blocks at both terminals and a hydrogenated polyfarnesene block between these two polystyrene blocks.

The total content of the farnesene homopolymer and the farnesene copolymer including a constituent unit derived from farnesene (i.e., content of farnesene-based polymers) is preferably 5 mass parts or more, more preferably 10 mass parts or more, still more preferably 20 mass parts or more, when the total mass (X1) of the ethylene-α-olefin block copolymer (OBC) and the ethylene-vinyl acetate copolymer (EVA) is 100 mass parts. The aforementioned total content of the farnesene homopolymer and the farnesene copolymer is preferably 100 mass parts or less, more preferably 75 mass parts or less. The total content of the farnesene-based polymers preferably lies in a range set with a lower limit selected from the aforementioned lower limits and an upper limit selected from the aforementioned upper limits.

The polymer composition may further include, for example, a reinforcement material such as inorganic fillers or fibers, a coupling agent for improving affinity between the reinforcement material and a resin, or the like. The polymer composition may include, for example, an adhesion improving agent such as a rosin or an acid-modified polymer. The polymer composition may further include, for example, a softening agent such oil, an antiaging agent, an antioxidant, a weather-proof agent, an ultraviolet absorbent, a light stabilizer, a flame retardant, a pigment, a mold releasing agent, an electrostatic preventing agent, an antimicrobial agent, a fungicidal agent, a deodorizer, a fragrance, or the like.

Examples of the inorganic fillers include silica particles, alumina particles, talc particles, clay particles, calcium carbonate particles, magnesium carbonate particles, aluminum hydroxide particles, and magnesium hydroxide particles. The inorganic fillers may be included in the polymer composition at a ratio of 1 mass % or more and 20 mass % or less. In this embodiment, it is preferable that calcium carbonate particles be included at a ratio of 1 mass % or more and 20 mass % or less.

Examples of the fibers include: aliphatic polyamide fibers such as polyamide 6 fibers, polyamide 6,6 fibers, polyamide 11 fibers, or polyamide 12 fibers; aromatic polyamide fibers such as poly-p-phenylene terephthalamide fibers or poly-m-phenylene isophthalamide fibers; polyolefin fibers such as polyethylene fibers or polypropylene fibers; polyester fibers such as polyethylene terephthalate fibers, polybutylene terephthalate fibers, polyethylene naphthalate fibers, polybutylene naphthalate fibers, polylactate fibers, or polyarylate fibers; polyphenylene sulfide fibers, polyurethane fibers, acrylic fibers, poly(para-phenylene benzobisoxazole) fibers, polyimide fibers, polyvinyl alcohol fibers, and fluorine resin fibers.

Examples of the fibers include cotton fibers, linen fibers, silk fibers, wool fibers, cellulose fibers, acetate fibers, and rayon fibers. The fibers may be, for example, carbon nanofibers or cellulose nanofibers.

Examples of the coupling agent include a silane coupling agent and a titanate coupling agent.

Examples of the rosin include a tall rosin, a gum rosin, and a wood rosin.

Examples of the acid-modified polymer include a copolymer of a polar monomer such as maleic acid anhydride or maleic acid ester, and an olefin-based monomer such as ethylene, propylene, or α-olefin having 4 or more carbon atoms. The copolymer may be a block copolymer or a random copolymer, in which the polar polymer constitutes a main chain, or a graft copolymer, in which the polar polymer constitutes a side chain. The copolymer may be a copolymer including three or more monomers composed of a plurality of olefin-based monomers and one or more polar monomers, as constituent units.

The content ratio of the components other than the ethylene-α-olefin block copolymer (OBC), the ethylene-vinyl acetate copolymer (EVA), the farnesene homopolymer, and the farnesene copolymer in the polymer composition is generally 30 mass % or less. The aforementioned content ratio is preferably 25 mass % or less, more preferably 20 mass % or less.

The foam constituting the midsole 3 may include a foaming agent. The foam may have been crosslinked or may include a crosslinking agent or a crosslinking aid.

Examples of the foaming agent include an azo compound such as azodicarbonamide (ADCA), 1,1'-azobis(1-acetoxy-1-phenylethane), dimethyl-2,2'-azobisbutyrate, dimethyl-2, 2'-azobisisobutyrate, 2,2'-azobis(2,4,4-trimethylpentane), 1,1'-azobis(cyclohexane-1-carbonitrile), or 2,2'-azobis[N-(2-carboxyethyl)-2-methyl-propionamidine]; a nitroso compound such as N,N'-dinitrosopentamethylenetetramine (DPT); a hydrazine derivative such as 4,4'-oxybis(benzenesulfonylhydrazide) or diphenylsulfone-3,3'-disulfonylhydrazide; a semicarbazide compound such as p-toluenesulfonyl semicarbazide; and an organic heat decomposable foaming agent such as trihydrazinotriazine.

The foaming agent may be, for example, a thermally decomposable inorganic foaming agent that can be: a bicarbonate such as sodium bicarbonate or ammonium bicarbonate, or a carbonate such as sodium carbonate or ammonium carbonate; a nitrite such as ammonium nitrite; or a hydrogen compound.

In the case where the foaming agent is a thermally decomposable foaming agent as described above, the polymer composition may include, for example, a foaming aid such as a metal oxide-based foaming aid like zinc oxide, a urea-based foaming aid, a salicylic foaming aid, or a benzoic foaming aid.

The foaming agent may be, for example, an organic foaming agent of aliphatic hydrocarbons such as methanol, ethanol, propane, butane, pentane, or hexane, or an inorganic foaming agent such as air, carbon dioxide, nitrogen, argon, or water.

Examples of the crosslinking agent include an organic peroxide such as dicumyl peroxide, di-t-butyl peroxide, 2,5-dimethyl-2,5-di-(t-butylperoxy)hexane, 2,5-dimethyl-2, 5-di-4-butylperoxy)hexane-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butylperoxyisopropyl carbonate, diacetyl peroxide, lauroyl peroxide, or t-butylcumyl peroxide.

Examples of the crosslinking aid include divinylbenzene, trimethylolpropane trimethacrylate, 1,6-hexanediol methacrylate, 1,9-nonanediol dimethacrylate, 1,10-decanediol dimethacrylate, triallyl trimellitate ester, triallyl cyanurate (TAC), triallyl isocyanurate (TAIC), neopentylglycol dimethacrylate, triallyl 1,2,4-benzenetricarboxylate ester, tricyclodecane dimethacrylate, and polyethyleneglycol diacrylate.

The contents of the foaming agent and the crosslinking agent in the polymer composition at the time of forming the foam may be appropriately adjusted depending on the degree of foaming or the degree of crosslinking required for the foam.

In order to allow the shoe 1 to exhibit excellent lightweight properties, the midsole 3 of this embodiment is preferably composed of a foam having a density value of 0.5 g/cm$^3$ or less, which is measured by the method A "Underwater displacement" of JIS K 7112 at a temperature of 23° C. The density of the foam is more preferably 0.40 g/cm$^3$ or less, still more preferably 0.30 g/cm$^3$ or less, particularly preferably 0.25 g/cm$^3$ or less. The density can be measured using a hydrometer having a mechanism for preventing floating of samples, and can be measured, for example, using a commercially available hydrometer from Alfa Mirage Co., Ltd., as a high-precision electronic hydrometer.

The loss tangent (tan δ) at normal temperature (23° C.) of the foam that constitutes the midsole 3 is preferably 0.08 or more, more preferably 0.09 or more, still more preferably 0.1 or more. The aforementioned loss tangent is generally 0.25 or less.

The loss tangent (tan δ) of the foam can be obtained by dynamic viscoelasticity test, and obtained by determining a loss elastic modulus (G") and a storage elastic modulus (G') by the dynamic viscoelasticity test, followed by calculating the ratio (G"/G' (=tan δ)) of the loss elastic modulus (G") to the storage elastic modulus (G').

The dynamic viscoelasticity test can be performed according to JIS K7244-4, for example, in the manner as described below.

<Test Method of Dynamic Viscoelasticity Test>

A strip-shaped test piece having certain dimensions (for example, with a length of 33±3 mm, a width of 5±0.3 mm, and a thickness of 2±0.3 mm) is collected from the midsole 3. If there is a difficulty in cutting such a test piece from the midsole 3, a strip-shaped test piece may be cut out from a foam sheet produced from a polymer composition having the same constituents as those of the midsole 3. The strip-shaped test piece is set to a dynamic viscoelasticity measuring instrument such that a distance between chucks is 20±0.2 mm. The test is performed in the conditions with tensile mode of a sinusoidal strain as a measurement mode; an automatic static load; a dynamic strain rate of 5 μm (0.025%); and a frequency of 10 Hz. The test temperature of the dynamic viscoelasticity test is 23° C. and the strip-shaped test piece is held in an environment at 23° C. over 12 hours to be served as a test piece for dynamic viscoelasticity test.

The midsole 3 of this embodiment exhibits comfortability by absorbing a shock applied to a heel when the wearer wearing the shoe including the midsole 3 walks or runs. In this embodiment, as an example, the midsole 3 is entirely composed of the foam, but the midsole according to the present invention may be, for example, a composite body of a foam and a separate sheet body.

In the shoe 1 of this embodiment, another foam may be provided in the shoe sole as a cushion in addition to the foam that constitutes the midsole 3.

In the shoe 1 of this embodiment, at least one of the inner sole 5a and the sock liner 5b may be partially or entirely composed of the foam as described above to exhibit excellent cushioning properties in addition to the midsole 3.

In the shoe 1 of this embodiment, as an alternative to the midsole 3, at least one of the inner sole 5a and the sock liner 5b may be partially or entirely composed of the foam as described above to exhibit excellent cushioning properties.

Figure 3:
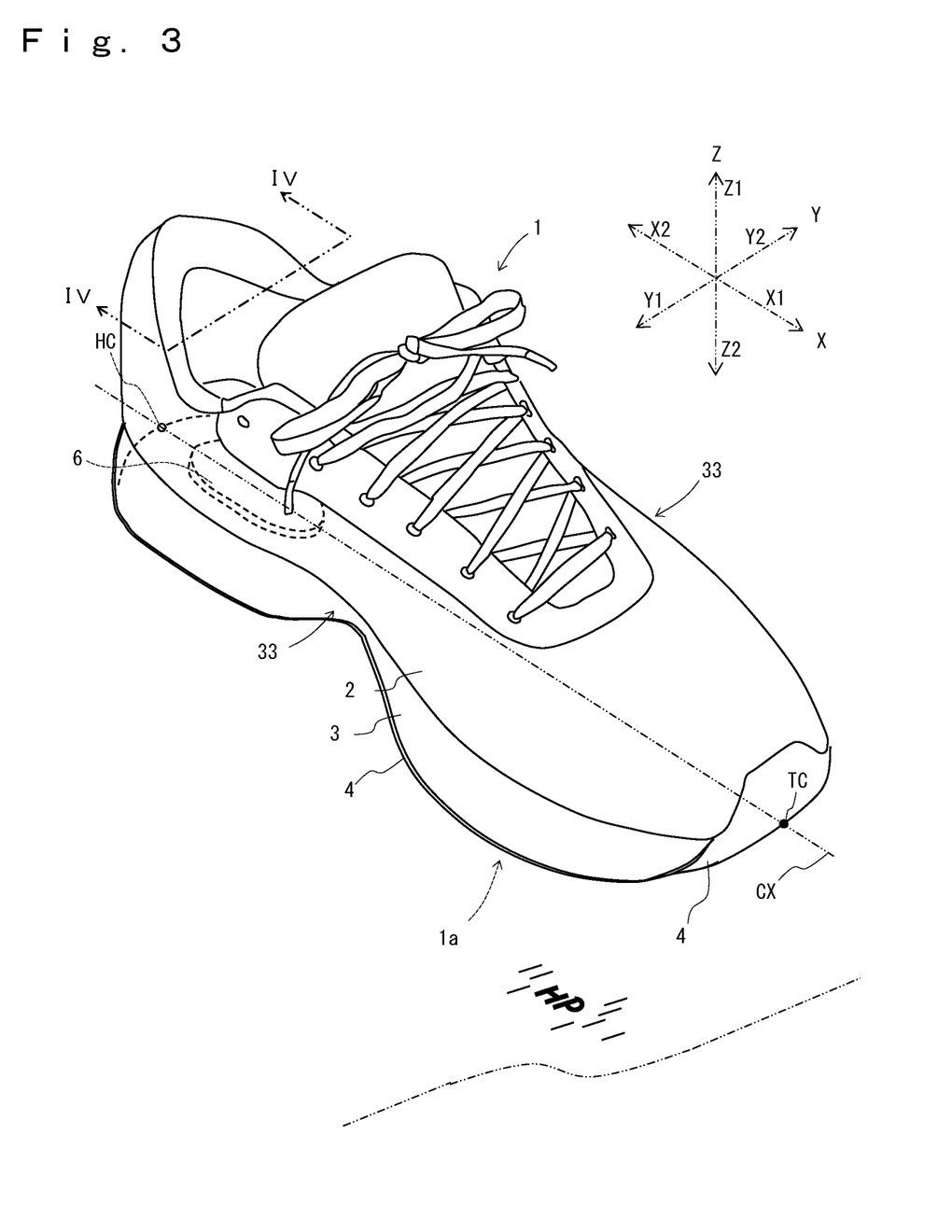
FIG. 3 is a schematic perspective view showing an example of a shoe including a cushioning part according to another form different from FIG. 1.
Figure 4:
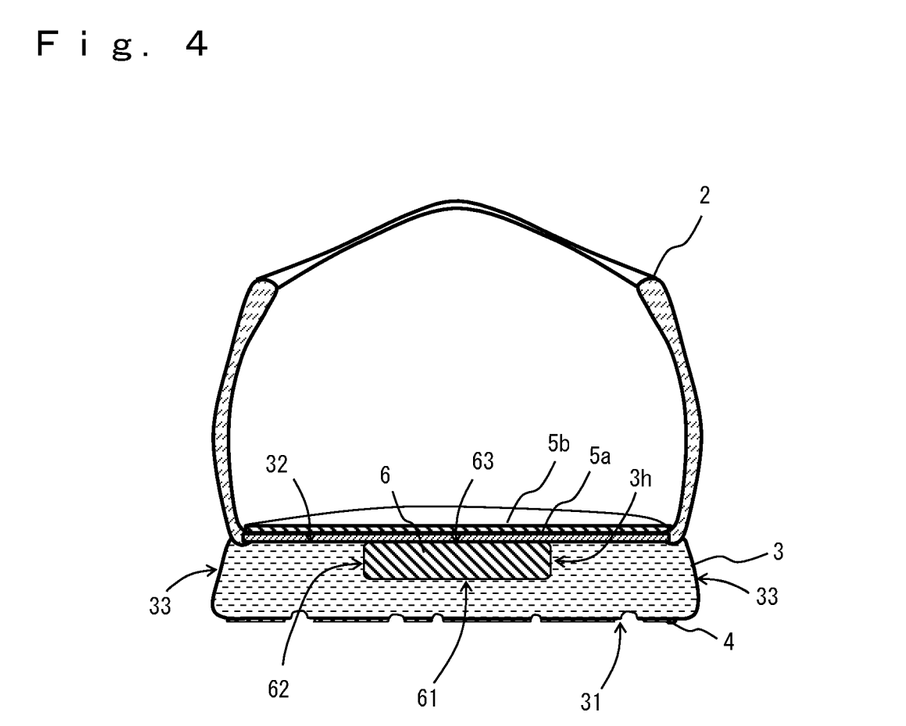
FIG. 4 is schematic cross-sectional view showing an arrangement of the cushion (i.e., a cross-sectional view taken along the line and viewed in the direction of arrows IV-IV thereof in FIG. 3).

In the shoe 1 of this embodiment, another foam for serving as a cushion may be arranged at a position where the midsole 3 is arranged, in addition to the foam that constitutes the midsole 3. The shoe having such a formation will be described with reference to FIG. 3 and FIG. 4. In FIG. 3 and FIG. 4, the common reference numbers are allocated to the parts or members having the same configurations as the shoe 1 shown FIG. 1 and FIG. 2. Hereinafter, the description for the same configuration as the shoe 1 shown FIG. 1 and FIG. 2 will not be repeated.

The midsole 3 of the shoe 1 shown in FIG. 3 and FIG. 4 includes a recessed part 3h that is located in an area (i.e., heel support area), to which a load is applied through a heel of a wearer, and is open upwardly. In the shoe 1, another foam in addition to the foam that constitutes the midsole 3 is placed in the recessed part 3h as a shock absorbing material 6. In this embodiment, the shock absorbing material 6 is provided in the shoe sole as a cushion. The shock absorbing material 6 is arranged to have a lower surface 61 in contact with a bottom surface of the recessed part 3h, a peripheral surface 62 in contact with a peripheral wall of the recessed part 3h, and a top surface 63 forming a single plane with the upper surface 32 of the midsole 3. That is, the shock absorbing material 6 of this embodiment is formed to have a smaller area than the midsole 3 when viewed from the top and have a smaller thickness than the midsole 3 when viewed from the side.

The top surface 63 of the shock absorbing material 6 may not necessarily form the single plane with the upper surface 32 of the midsole 3. For example, the shock absorbing material 6 may be embedded inside the midsole 3.

The shock absorbing material 6 of this embodiment may be also arranged in any part other than the heel part. In this embodiment, as an example, the shock absorbing material 6 is entirely composed of the foam, but the cushion according to the present invention may be, for example, a composite body of a foam and a sheet body, such as a composite body having a sandwich structure in which a foam is sandwiched between two fiber sheets. Further, the cushion according to the present invention may be a composite body having a structure different from that of the aforementioned composite body.

As described above, the cushion of this embodiment is a cushion partially or entirely composed of a foam composed of a polymer composition, wherein the polymer composition includes: a first component composed of one or more farnesene-based polymers; and a second component composed of one or more polymers different from the one or more farnesene-based polymers. The farnesene-based polymer is effective to improve a loss tangent value (tan δ) of the foam. Therefore, the cushion of this embodiment is excellent in cushioning performance.

In this embodiment, the aforementioned polymers having a Type-A durometer hardness of 93 or less may be included in the second component. The second component including a soft polymer enables the farnesene-based polymer to more significantly exhibit the effect of improving the cushioning properties.

The second component may include at least one of ethylene-α-olefin block copolymer and ethylene-vinyl acetate copolymer. These polymers enables the farnesene-based polymer to more significantly exhibit the effect of improving the cushioning properties.

In this embodiment, the second component may include the ethylene-vinyl acetate copolymer. The ethylene-vinyl acetate copolymer is relatively easily foamed at a high expansion ratio. Further, the ethylene-vinyl acetate copolymer provides an advantageous effect of forming a foam excellent in adhesion properties.

This embodiment may be configured such that the second component includes both of the ethylene-vinyl acetate copolymer and the ethylene-α-olefin block copolymer, and the ethylene-α-olefin block copolymer is either ethylene-hexene block copolymer or ethylene-octene block copolymer and is a chain shuttling copolymer. The ethylene-α-olefin block copolymer included in the second component together with the ethylene-vinyl acetate copolymer is such a chain shuttling copolymer, thereby enabling the foam to exhibit excellent strength.

In this embodiment, the first component may include a hydrogenated styrene farnesene block copolymer. The farnesene-based polymer formed as described above allows the physical properties derived from farnesene to be reflected in the physical properties of the foam, thereby enabling the foam to be more excellent in cushioning properties.

In this embodiment, the cushion is applied to a shoe as an example, but the cushion of the present invention is not necessarily applied only to the shoe and is available for a wide range of applications. That is, the present invention is not limited to the aforementioned exemplification in any way.

Examples

Next, the present invention will be described in more detail by way of Examples, but not limited thereto.
<Compound Materials (No. 1)>
The following compound materials were prepared for preparing polymer compositions.
0) Copolymer Including a Constituent Unit Derived from Farnesene Masterbatch (MB) including approximately 50 mass % of hydrogenated styrene farnesene block copolymer, which is a triblock copolymer (PS/PF/PS) including polystyrene blocks (PS) at both terminals and a polyfarnesene block (PF) between these two polystyrene blocks, and having a Type-A durometer hardness (hereinafter also referred to as "HA") of 25°.
1-1) Ethylene-α-Olefin Random Copolymer (POE1)

Ethylene-α-olefin random copolymer, which is a random copolymer including constituent units derived from ethylene and α-olefin, having a melting point (mp) of 66° C. and having an HA (Type-A durometer hardness) of 87°.
1-2) Ethylene-α-olefin block copolymer (OBC1)

Ethylene-α-olefin block copolymer, which is a chain shuttling copolymer including constituent units derived from ethylene and α-olefin, having a melting point (mp) of 119° C. and having an HA (Type-A durometer hardness) of 77°.
1-3) Ethylene-Vinyl Acetate Copolymer (EVA1)

Ethylene-vinyl acetate copolymer having a content ratio of vinyl acetate (VA) of 25 mass %, having a melting point (mp) of 77° C., and having an HA (Type-A durometer hardness) of 88°.

1-4) Inorganic filler
Calcium carbonate particles ($CaCO_3$)
1-5) Various additives
Activator: Zinc oxide, stearic acid
Crosslinking agent: Dicumyl peroxide (DCP)
Foaming agent: Organic heat decomposable foaming agent (azodicarbonamide (ADCA))
<Evaluation 1: Preparation of "Foam 1-0">
A foam represented as "Ref." in Table 1 was produced by using only the aforementioned masterbatch as the polymer component. The hardness (Asker C hardness), the specific gravity, and the loss tangent (tan δ) of the foam were measured. The results are collectively shown in Table 1.
<Evaluation 1: Preparation of "Foam 1-1" to "Foam 1-3">
Using the ethylene-α-olefin random copolymer (POE1) and the masterbatch (MB) as the polymer component, a foam (1-1) using only the ethylene-α-olefin random copolymer (POE1) and foams (1-2, 1-3) additionally using the masterbatch (MB) were produced. The hardness (Asker C hardness), the specific gravity, and the loss tangent (tan δ) of each of the foams were measured. By taking the loss tangent value (tan δ) of a foam with no masterbatch (MB) as a reference value (100%), the ratio of the loss tangent value (tan δ) of the foam using the masterbatch (MB) relative to the reference value was referred to as "rate of improvement in tan δ". The results are collectively shown in Table 1.

TABLE 1

| | | Ref. | 1-1 | 1-2 | 1-3 |
|---|---|---|---|---|---|
| Farnesene MB | PS/PF/PS | 100 | | 25 | 50 |
| POE1 | mp = 66° C., HA87 | | 100 | 75 | 50 |
| Filler | CaCO3 | 3 | 3 | 3 | 3 |
| Activator | ac-ZnO | 1.5 | 1.5 | 1.5 | 1.5 |
| Activator | Stearic acid | 1.5 | 1.5 | 1.5 | 1.5 |
| Crosslinking agent | DCP | 1.2 | 1.2 | 1.2 | 1.2 |
| Foaming agent | ADCA | 3.0 | 2.0 | 3.0 | 2.0 |
| Hardness [°] | | — | 43 | 39 | 29 |
| Specific gravity [—] | | — | 0.17 | 0.19 | 0.20 |
| tanδ [—] | | 0.142 | 0.071 | 0.073 | 0.095 |
| Rate of improvement in tanδ [%] | | — | 100 | 103 | 134 |

<Evaluation 2: Preparation of "Foam 2-1" to "Foam 2-3">
Using the ethylene-α-olefin block copolymer (OBC1) and the masterbatch (MB) as the polymer component as shown in Table 2, a foam (2-1) using only the ethylene-α-olefin block copolymer (OBC1) and foams (2-2, 2-3) additionally using the masterbatch (MB) were produced. The hardness (Asker C hardness), the specific gravity, and the loss tangent (tan δ) of each of the foams were measured. By taking the loss tangent value (tan δ) of a foam with no masterbatch (MB) as a reference value (100%), the ratio of the loss tangent value (tan δ) of the foam using the masterbatch (MB) relative to the reference value was referred to as "rate of improvement in tan δ". The results are collectively shown in Table 2.

TABLE 2

| | | Ref. | 2-1 | 2-2 | 2-3 |
|---|---|---|---|---|---|
| Farnesene MB | PS/PF/PS | 100 | | 25 | 50 |
| OBC1 | mp = 119° C., HA87 | | 100 | 75 | 50 |
| Filler | CaCO3 | 3 | 3 | 3 | 3 |
| Activator | ac-ZnO | 1.5 | 1.5 | 1.5 | 1.5 |
| Activator | Stearic acid | 1.5 | 1.5 | 1.5 | 1.5 |
| Crosslinking agent | DCP | 1.2 | 0.6 | 1.05 | 1.2 |

TABLE 2-continued

|  |  | Ref. | 2-1 | 2-2 | 2-3 |
|---|---|---|---|---|---|
| Foaming agent | ADCA | 3.0 | 2.4 | 3.0 | 2.0 |
|  | Hardness [°] | — | 45 | 38 | 37 |
|  | Specific gravity [—] | — | 0.19 | 0.19 | 0.20 |
|  | tanδ [—] | 0.142 | 0.075 | 0.083 | 0.104 |
|  | Rate of improvement in tanδ [%] | — | 100 | 111 | 139 |

<Evaluation 3: Preparation of "Foam 3-1" to "Foam 3-3">

Using the ethylene-vinyl acetate copolymer (EVA1) and the masterbatch (MB) as the polymer component as shown in Table 3, a foam (3-1) using only the ethylene-vinyl acetate copolymer (EVA1) and foams (3-2, 3-3) additionally using the masterbatch (MB) were produced. The hardness (Asker C hardness), the specific gravity, and the loss tangent (tan δ) of each of the foams were measured. By taking the loss tangent value (tan δ) of a foam with no masterbatch (MB) as a reference value (100%), the ratio of the loss tangent value (tan δ) of the foam using the masterbatch (MB) relative to the reference value was referred to as "rate of improvement in tan δ". The results are collectively shown in Table 3.

TABLE 3

|  |  | Ref. | 3-1 | 3-2 | 3-3 |
|---|---|---|---|---|---|
| Farnesene MB | PS/PF/PS | 100 |  | 25 | 50 |
| EVA1 | VA = 25%, mp = 77° C., HA88 |  | 100 | 75 | 50 |
| Filler | CaCO3 | 3 | 3 | 3 | 3 |
| Activator | ac-ZnO | 1.5 | 1.5 | 1.5 | 1.5 |
| Activator | Stearic acid | 1.5 | 1.5 | 1.5 | 1.5 |
| Crosslinking agent | DCP | 1.2 | 1.0 | 0.75 | 0.9 |
| Foaming agent | ADCA | 3.0 | 2.8 | 2.1 | 2.1 |
|  | Hardness [°] | — | 44 | 39 | 27 |
|  | Specific gravity [—] | — | 0.18 | 0.20 | 0.19 |
|  | tanδ [—] | 0.142 | 0.064 | 0.102 | 0.126 |
|  | Rate of improvement in tan [%] | — | 100 | 159 | 197 |

It is evident from the above results that the loss tangent values (tan δ) of the foams were improved, and particularly, the loss tangent values (tan δ) of "Foam 2-2", "Foam 2-3", "Foam 3-2", and "Foam 3-3" were significantly improved, by including the homopolymer or the copolymer including a constituent unit derived from farnesene. That is, it is evident from the above results that the loss tangent value is significantly improved when the homopolymer or the copolymer including a constituent unit derived from farnesene is added to the ethylene-α-olefin block copolymer or the ethylene-vinyl acetate copolymer.

<Compound Materials (No. 2)>

Next, the following compound materials were prepared.
2-1) Ethylene-vinyl acetate copolymer (EVA2)

Ethylene-vinyl acetate copolymer having a content ratio of vinyl acetate (VA) of 6 mass %, having a melting point (mp) of 99° C., and having an HA (Type-A durometer hardness) of 97°. 2-2) Ethylene-vinyl acetate copolymer (EVA3)

Ethylene-vinyl acetate copolymer having a content ratio of vinyl acetate (VA) of 6 mass %, having a melting point (mp) of 94° C., and having an HA (Type-A durometer hardness) of 96°.

2-3) Ethylene-Vinyl Acetate Copolymer (EVA4)

Ethylene-vinyl acetate copolymer having a content ratio of vinyl acetate (VA) of 6 mass %, having a melting point (mp) of 88° C., and having an HA (Type-A durometer hardness) of 94°.

<Evaluation 4>

Using the inorganic filler and the additives (activator, crosslinking agent, and foaming agent) used in Evaluation 1 to Evaluation 3 described above, foams were produced in the same manner as Evaluation 1 to Evaluation 3. First, a foam (Foam 4-1) was produced by using only "EVA2" without adding the masterbatch (MB) as the polymer component as shown in Table 4 below. Next, a foam (Foam 4-2) was produced by using the masterbatch (MB) and "EVA2". In the same manner, foams respectively using "EVA3" and "EVA4" with and without the masterbatch (MB) were produced. The evaluations were made for them in the same manner as Evaluation 1 to Evaluation 3. The results revealed that "EVA2" to "EVA4" having a high Type-A durometer hardness value enables the foam to reduce the Asker C hardness when used with the masterbatch (MB), but does not enable the foam to show a high value of the rate of improvement in tan δ as that in Evaluation 3 (EVA1).

TABLE 4

|  |  | Ref.(3-1vs3-3) | 4-1 | 4-2 | 4-3 | 4-4 | 4-5 | 4-6 |
|---|---|---|---|---|---|---|---|---|
| Farnesene MB | PS/PF/PS | 50 |  | 50 |  | 50 |  | 50 |
| EVA1 | VA = 25%, mp = 77° C., HA88 | 100 | 50 |  |  |  |  |  |
| EVA2 | VA = 6%, mp = 99° C., HA97 |  |  | 100 | 50 |  |  |  |
| EVA3 | VA = 10%, mp = 94° C., HA96 |  |  |  |  | 100 | 50 |  |
| EVA4 | VA = 15%, mp = 88° C., HA94 |  |  |  |  |  |  | 100 | 50 |
| Filler | CaCO3 | 3 | 3 | 3 | 3 | 3 | 3 | 3 | 3 |
| Activator | ac-ZnO | 1.5 | 1.5 | 1.5 | 1.5 | 1.5 | 1.5 | 1.5 | 1.5 |
| Activator | Stearic acid | 1.5 | 1.5 | 1.5 | 1.5 | 1.5 | 1.5 | 1.5 | 1.5 |
| Crosslinking agent | DCP | 1.0 | 0.9 | 1.2 | 1.2 | 0.9 | 1.2 | 0.90 | 0.9 |
| Foaming agent | ADCA | 2.8 | 2.1 | 2.0 | 2.0 | 2.0 | 2.0 | 2.0 | 2.0 |
|  | Hardness [°] | 44 | 27 | 57 | 47 | 73 | 35 | 64 | 27 |
|  | Specific gravity [—] | 0.18 | 0.19 | 0.14 | 0.16 | 0.20 | 0.19 | 0.19 | 0.19 |
|  | Rate of improvement in tanδ | 197% |  | ※1 |  | ※1 |  | ※1 |

※1 There was no great change in the loss tangent value (tanδvalue) (rate of improvement: approx. 100%)

<Compound Materials (No. 3)>

Next, the following compound materials were prepared.
3-1) Ethylene-α-olefin random copolymer (POE2)

Ethylene-α-olefin random copolymer, which is a random copolymer including constituent units derived from ethylene and α-olefin, having a melting point (mp) of 94° C. and having an HA (Type-A durometer hardness) of 95°.

<Evaluation 5>

Using the inorganic filler and the additives (activator, crosslinking agent, and foaming agent) used in Evaluation 1 to Evaluation 3 described above, foams were produced in the same manner as Evaluation 1 to Evaluation 3. First, a foam (Foam 5-1) was produced by using only "POE2" without adding the masterbatch (MB) as the polymer component as shown in Table 5 below. Next, a foam (Foam 5-2) was produced by using the masterbatch (MB) and "POE2". These foams were evaluated in the same manner as Evaluations 1 to Evaluation 3. The results are shown in Table 5 below. It could be confirmed from these results that "POE2" having a high Type-A durometer hardness value shows a low rate of improvement in the loss coefficient.

TABLE 5

|  |  | Ref.(1-1vs1-3) | 5-1 | 5-2 |
|---|---|---|---|---|
| Farnesene MB | PS/PF/PS |  | 50 | 50 |
| POE1 | mp = 66° C., HA87 | 100 | 50 |  |
| POE2 | mp = 94° C., HA95 |  |  | 100 | 50 |
| Filler | CaCO3 | 3 | 3 | 3 | 3 |
| Activator | ac-ZnO | 1.5 | 1.5 | 1.5 | 1.5 |
| Activator | Stearic acid | 1.5 | 1.5 | 1.5 | 1.5 |
| Crosslinking agent | DCP | 1.2 | 1.2 | 1.2 | 1.2 |
| Foaming agent | ADCA | 2.0 | 2.0 | 2.0 | 2.0 |
|  | Hardness [°] | 43 | 29 | 75 | 40 |
|  | Specific gravity [—] | 0.17 | 0.19 | 0.20 | 0.20 |
|  | Rate of improvement in tanδ | 134% | | 108% | |

<Compound Materials (No. 4)>

Next, the following compound materials were prepared.
4-1) Styrene-based thermoplastic elastomer (TPS1)

Styrene-ethylene-butylene-styrene copolymer (SEBS) having a styrene content of approximately 18 mass % and having an HA (Type-A durometer hardness) of 67°.
4-2) EPR (EPR1)

Ethylene-propylene rubber having an ethylene content of approximately 52 mass % and having a HA (Type-A durometer hardness) after vulcanization of 60°.

<Evaluation 6>

Using the inorganic filler and the additives (activator, crosslinking agent, and foaming agent) used in Evaluation 1 to Evaluation 3 described above, foams were produced and evaluated in the same manner as Evaluation 1 to Evaluation 3. The results are shown in Table 6 below. It could be confirmed from these results that the second component can include not only a resin such as EVA but also rubber.

TABLE 6

|  |  | 6-1 | 6-2 | 6-3 | 6-4 |
|---|---|---|---|---|---|
| Farnesene MB | PS/PF/PS |  | 50 |  | 50 |
| TPS1 | HA67 | 100 | 50 |  |  |
| EPR1 | HA60 |  |  | 100 | 50 |
| Filler | CaCO3 | 3 | 3 | 3 | 3 |
| Activator | ac-ZnO | 1.5 | 1.5 | 1.5 | 1.5 |
| Activator | Stearic acid | 1.5 | 1.5 | 1.5 | 1.5 |
| Crosslinking agent | DCP | 1.2 | 1.2 | 1.0 | 1.0 |
| Foaming agent | ADCA | 2.0 | 2.0 | 3.0 | 2.0 |
|  | Hardness [°] | 45 | 23 | 42 | 30 |
|  | Specific gravity [—] | 0.20 | 0.21 | 0.20 | 0.22 |
| tanδ [—] | | 0.060 | 0.094 | 0.074 | 0.098 |
| Rate of improvement in tanδ [%] | | 100 | 156 | 100 | 132 |

It is evident from the aforementioned results that the present invention can provide the foam having a high loss tangent and can provide the cushion excellent in cushioning performance and the shoe excellent in cushioning performance.

Although the cushion and the shoe according to this embodiment are as described above, the present invention is not limited to the aforementioned embodiment and the design may be appropriately changed within the scope where the present invention is intended. Also, the functional effect of the present invention is not limited to the aforementioned embodiment. That is, the embodiments disclosed herein should be assumed as not limitations but exemplifications in all aspects. The scope of the present invention is described not by the above description but by the claims. Further, the scope of the present invention is intended to include the scope equivalent to the claims and all the changes in the claims.

What is claimed is:

1. A cushion partially or entirely composed of a foam, the foam composed of a polymer composition, wherein
the polymer composition comprises:
a first component composed of one or more farnesene-based polymers; and
a second component composed of one or more polymers different from the one or more farnesene-based polymers,
a ratio of the first component based on the total mass of the first component and the second component is 1 mass % or more and 60 mass % or less,
the second component includes styrene-based thermoplastic elastomer, ethylene-vinyl acetate copolymer and optionally ethylene-α-olefin block copolymer,
a ratio of an amount of the ethylene-vinyl acetate copolymer and ethylene-α-olefin block copolymer based on a total amount of the second component is 60 mass % or more, and
a ratio of the ethylene-vinyl acetate copolymer based on the total mass of ethylene-vinyl acetate copolymer and ethylene-α-olefin block copolymer is 90 mass % or more.

2. The cushion according to claim 1, wherein
the one or more polymers of the second component have a Type-A durometer hardness of or less.

3. The cushion according to claim 1, wherein
the second component comprises both of the ethylene-vinyl acetate copolymer and the ethylene-α-olefin block copolymer, and
the ethylene-α-olefin block copolymer is either ethylene-hexene block copolymer or ethylene-octene block copolymer, and is a chain shuttling copolymer.

4. The cushion according to claim 1, wherein
the first component comprises a hydrogenated styrene farnesene block copolymer.

5. The cushion according to claim 2, wherein
the first component comprises a hydrogenated styrene farnesene block copolymer.

6. The cushion according to claim 3, wherein the first component comprises a hydrogenated styrene farnesene block copolymer.

7. A shoe comprising a shoe sole that comprises the cushion according to claim 1.

* * * * *